Patented June 26, 1951

2,558,319

UNITED STATES PATENT OFFICE 2,558,319

PROCESS FOR PRODUCTION OF CHLORAL AND CHLORAL HYDRATE, AND THEIR PHENYL CONDENSATION PRODUCT

Joseph A. Sonia, Niagara Falls, N. Y., assignor to Hooker Electrochemical Company, Niagara Falls, N. Y., a corporation of New York No Drawing. Application December 11, 1947, Serial No. 791,160

4 Claims. (Cl. 260—601)

My invention relates more particularly to chlorination of ethyl alcohol and reactions in which molecules of benzene derivatives are condensed together by means of the chlorination products of ethyl alcohol, as in the well-known insecticide dichlor diphenyl trichlor ethane, or more properly 2,2 - bis(parachlorophenyl) 1,1,1 - trichlorethane, commonly known as "DDT". I will describe my process as exemplified by production of this compound.

DDT has heretofore been generally produced by reaction of monochlor benzene with chloral, in accordance with the following reaction:

$$2C_6H_5Cl + CCl_3CHO + H_2SO_4 \rightarrow$$
$$(C_6H_4Cl)_2CHCCl_3 + H_2O + H_2SO_4 \quad (1)$$

In reaction (1) the sulphuric acid acts merely as a condensing agent by reason of its affinity for the water produced.

Chloral is produced by chlorinating ethyl alcohol, in accordance with the following reaction:

$$C_2H_5OH + 4Cl_2 \rightarrow CCl_3CHO + 5HCl \quad (2)$$

Reaction (2) is, however, accompanied by reactions resulting in production of considerable quantities of trichlor ethyl alcoholate (chloral alcoholate), dichlor ethyl alcoholate and chloral hydrate, in accordance with the following reactions:

$$2C_2H_5OH + 4Cl_2 \rightarrow$$
$$CCl_3CH(OH)OC_2H_5 + 5HCl \quad (3)$$

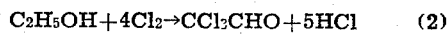

$$2C_2H_5OH + 3Cl_2 \rightarrow$$
$$CHCl_2CH(OH)OC_2H_5 + 4HCl \quad (4)$$

$$C_2H_5OH + 4Cl_2 + H_2O \rightarrow$$
$$CCl_3CHO \cdot H_2O + 5HCl \quad (5)$$

The chloral alcoholate and dichlor ethyl alcoholate of reactions (3) and (4) react with chlorbenzene to give products which are undesirable for my purpose, but chloral alcoholate and hydrate may be converted to chloral, which may then be used as in reaction (1), by reaction with sulphuric acid, as follows:

$$CCl_3CH(OH)OC_2H_5 + H_2SO_4 \rightarrow$$
$$CCl_3CHO + C_2H_5HSO_4 + H_2O \quad (6)$$

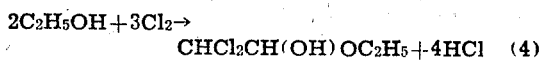

$$CCl_3CHO \cdot H_2O + H_2SO_4 \rightarrow$$
$$CCl_3CHO + H_2O + H_2SO_4 \quad (7)$$

The dichlor ethyl alcoholate present reacts with the sulphuric acid at the same time as follows:

$$CHCl_2CH(OH)OC_2H_5 + H_2SO_4 \rightarrow$$
$$CHCl_2CHO + C_2H_5HSO_4 + H_2O \quad (8)$$

It might be thought that since sulphuric acid is present in reaction (1), the chloral alcoholate of reaction (3) could be reacted directly with monochlorbenzene to form the desired end product, but this is impracticable, for the reason that the ethyl acid sulphate produced in reactions (6) and (8) is reactive with monochlorbenzene and must be removed before the chloral is reacted therewith. The dichloral of reaction (8) must likewise be removed.

The chloral of reactions (2), (6) and (7), after distillation to free it from the dichloral and ethyl acid sulphate, is then reacted with monochlorbenzene in accordance with reaction (1). This is the process by which "DDT" has heretofore been commonly made.

It is known, however, that chloral hydrate will likewise react with chlorbenzene to form "DDT," as follows:

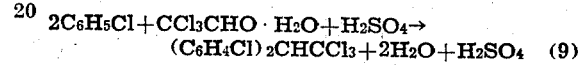

$$2C_6H_5Cl + CCl_3CHO \cdot H_2O + H_2SO_4 \rightarrow$$
$$(C_6H_4Cl)_2CHCCl_3 + 2H_2O + H_2SO_4 \quad (9)$$

This reaction has not heretofore been used as such, because the chloral hydrate made by chlorination of ethyl alcohol is in minor proportion and becomes converted to chloral when the mixture is reacted with sulphuric acid, as indicated in reaction (7).

I have now found that by carrying out the chlorination of ethyl alcohol under suitable conditions, including a substantial superatmospheric pressure, it may be caused to go entirely in accordance with reactions (2) and (5); that is to say, to chloral and choral hydrate. No alcoholates whatever are formed, and the only by-products are chlorides of ethane, which being volatile, are driven off during the chlorination. The resulting mixture of chloral and chloral hydrate may then be reacted directly with monochlorbenzene to form DDT, in accordance with reactions (1) and (9).

My process, therefore, comprises carrying out the chlorination of ethyl alcohol so that it goes entirely in accordance with reactions (2) and (5), and then reacting the resulting chloral and chloral hydrate with monochlorbenzene in accordance with reactions (1) and (9). I thereby eliminate reactions (6) and (7) altogether, as well as the distillation of chloral which is otherwise necessary, following this reaction.

Example I 394.3 grams of anhydrous ethyl alcohol and 30.7 grams of water were charged into a pressure type reactor equipped with a brine cooled reflux condenser, thermometer well, pressure gauge, and chlorine inlet tube extending nearly to its bottom. Gaseous chlorine from a supply of liquid chlorine under pressure was passed through a meter and filter of glass wool to the reactor at the rate of 51.8 grams per minute, with refluxing, and cooling to maintain the temperature at 55° to 70° C., and with free exit, until the efficiency of absorption of the chlorine started to fall. The temperature was then allowed to rise to 100° C. The exit was throttled and pressure was allowed to build up to from 27 to 30 pounds per sq. in. gauge. The chlorination was continued under these conditions until the chlorine absorption had fallen again to less than 5 per cent. A total of 3,170 grams of chlorine were consumed and the total time of the operation was 615 minutes. 1,005 grams of crude product, having a specific gravity of 1.615 at 30° C., were recovered. This represents the process of the present invention.

*Example II*

The same quantity of alcohol and water were charged into the same apparatus and the chlorination carried out under the same conditions, except that the gases were vented off throughout, so that no pressure could build up, and the rate of admission of chlorine was therefore kept at a lower figure, in order to maintain the conditions as favorable as possible for efficient absorption. The chlorination was continued as before until the efficiency of absorption had fallen below 5 per cent. The total chlorine consumption was 4140 grams and the time of the operation 1515 minutes, or more than twice that of Example I. 976.0 grams of crude product were recovered, having a specific gravity of 1.562, at 30° C. This represents the practice of the prior art.

The crude products of Examples I and II were then analyzed, with the following result:

|  | Present Invention | Prior Art |
| --- | --- | --- |
| Alcohol consumed_____grams_ | 393.4 | 393.4 |
| Crude product_____do___ | 1,005.0 | 976.0 |
| Chloral_____per cent__ | 34.8 | 49.4 |
| Chloral Hydrate_____do___ | 53.7 | 25.6 |
| Chloral alcoholate_____do___ | 0 | 9.1 |
| Product as chloral, calculated_____grams__ | 777.0 | 732.0 |
| Yield per cent of theoretical, based on alcohol___ | 62.0 | 58.0 |

In both of the above examples the chlorination was carried as far as practicable, in order that the results might be strictly comparable. In commercial practice the end point is determined by the specific gravity of the reaction mixture rather than by efficiency of chlorine absorption. The reaction mixture obtained by chlorination in accordance with my process has a specific gravity of 1.61 to 1.64, whereas that of the mixture obtained by chlorination in accordance with the prior art has a specific gravity of 1.50 to 1.55. Also, the proportion of water present is not critical. The reaction can be carried out with absolute alcohol but with lower yield. Similarly, it can be carried out with 80 per cent alcohol, but the time of reaction is longer. The optimum concentration of alcohol for my reaction is 90 per cent, and the range of finishing temperatures is from 90° to 110° C. The pressure is only limited by practical considerations. The reaction may be started with the exit closed, in which case, the pressure may build up to 100 lbs. per sq. inch gauge, or more. On the other hand, a pressure as low as 10 pounds per square inch is useful.

It should be remembered that in my process, there being no alcoholates or other undesirable by-products formed, no reaction with sulphuric acid is necessary to convert these to chloral and no distillation is required to free the chloral from dichloral and ethyl sulphate. Two steps are thus eliminated. Also, the time of reaction is approximately halved. Moreover, the above figures show that the yield of chloral, as such and as chloral hydrate, is higher in my process than the yield of chloral, as such and as chloral hydrate and alcoholate, in the process of the prior art. The yield of DDT from the mixture of chloral and chloral hydrate produced by my process is substantially the same as the yield of DDT from the chloral of the prior art process; hence, the increased yield of the intermediate in my process is carried through to the end product.

Although I have taken production of DDT for purpose of illustration, I do not wish to be limited thereto, as my process in its broadest aspect consists in chlorination of ethyl alcohol under conditions which prevent formation of alcoholates, whereby there is produced a mixture of chloral and chloral hydrate suitable for reaction directly with benzene or its halogenation, substitution or condensation products, to produce therefrom products of further condensation.

This application is a continuation-in-part of application Serial No. 597,952, filed June 6, 1945, now abandoned.

I claim as my invention:

1. The process for chlorination of ethyl alcohol to produce a mixture consisting of chloral and chloral hydrate, the hydrate being in large proportion, said mixture being substantially free from alcoholates, which comprises introducing gaseous chlorine into a body of the aqueous alcohol in a pressure type reactor with a free exit and refluxing and with cooling to maintain the temperature of the reaction mixture at between 55° to 70° C., until the efficiency of absorption of the chlorine starts to fall off; throttling the exit and causing the temperature of the reaction mixture to rise to between 90° and 110° C. and pressure of 10 to 100 pounds per square inch gauge to build up in the reactor; and so continuing the introduction of chlorine until the specific gravity of the reaction mixture has reached 1.61 to 1.64.

2. The process for chlorination of ethyl alcohol to produce a mixture consisting of chloral and chloral hydrate, the hydrate being in large proportion, said mixture being substantially free from alcoholates, which comprises introducing gaseous chlorine into a body of 90 to 95 per cent ethyl alcohol in a pressure type reactor, with a free exit and refluxing, and with cooling to maintain the temperature of the reaction mixture at between 55° and 70° C., until the efficiency of absorption of the chlorine starts to fall off; throttling the exit and causing the temperature of the reaction mixture to rise to between 90° and 110° C., and a pressure of 27 to 30 pounds per square inch gauge to build up in the reactor; continuing the introduction of chlorine until the specific gravity of the reaction mixture has reached 1.61 to 1.64.

3. The process for chlorination of ethyl alcohol to produce a mixture consisting of chloral and chloral hydrate, the hydrate being in large proportion, said mixture being substantially free from alcoholates, which comprises introducing gaseous chlorine into a body of substantially 92 per cent ethyl alcohol in a pressure type reactor, with a free exit and refluxing, and with cooling to maintain the temperature of the reaction mixture at between 55° and 70° C., until the efficiency of absorption of the chlorine starts to fall off; throttling the exit and causing the temperature of the reaction mixture to rise to substantially 100° C. and a pressure of 27 to 30 pounds per square inch gauge to build up in the reactor; and so continuing the introduction of chlorine until the specific gravity of the reaction mixture has reached 1.61 to 1.64.

4. In the production of 2,2-bis(parachlorophenyl)1,1,1-trichlorethane by reaction with monochlorbenzene of a mixture consisting of chloral and chloral hydrate, the hydrate being in large proportion, said mixture being substantially free from alcoholates, the step which comprises preparing said mixture by introducing gaseous chlorine into a body of ethyl alcohol in a pressure type reactor with free exit and refluxing, and with cooling to maintain the temperature of the reaction mixture at between 55° and 70° C., until the efficiency of absorption of the chlorine starts to fall off; throttling the exit and causing the temperature of the reaction mixture to rise to between 90° and 110° C., and a pressure of 10 to 100 pounds per square inch gauge to build upon the reaction mixture; and so continuing the introduction of chlorine until the specific gravity of the reaction mixture has reached 1.61 to 1.64.

JOSEPH A. SONIA.

REFERENCES CITED

The following references are of record in the file of this patent:

UNITED STATES PATENTS

| Number | Name | Date |
|---|---|---|
| 2,105,733 | Hass et al. | Jan. 18, 1933 |

OTHER REFERENCES

Groggins, "Unit Processes in Organic Synthesis," first edition, pages 192–4 (1935).